3,365,979
PISTON AND SLIPPER ASSEMBLY
Roger K. Ericson, Arlington Heights, Ill., assignor to Borg-Warner Corporation, Chicago, Ill., a corporation of Illinois
Filed July 15, 1965, Ser. No. 472,249
3 Claims. (Cl. 74—569)

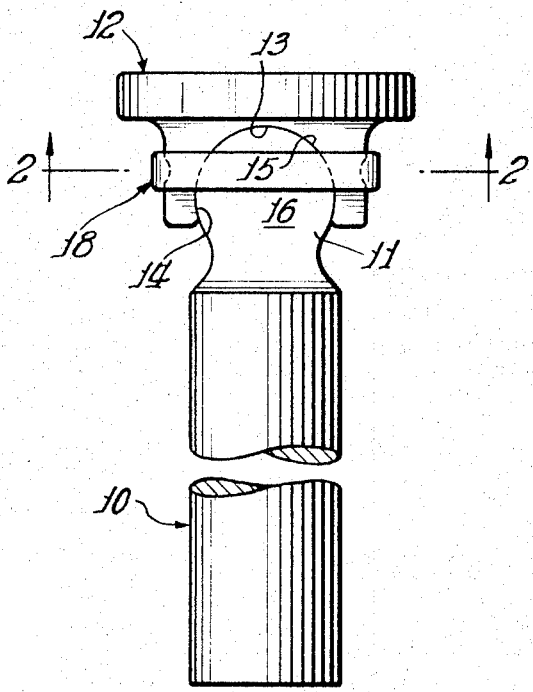
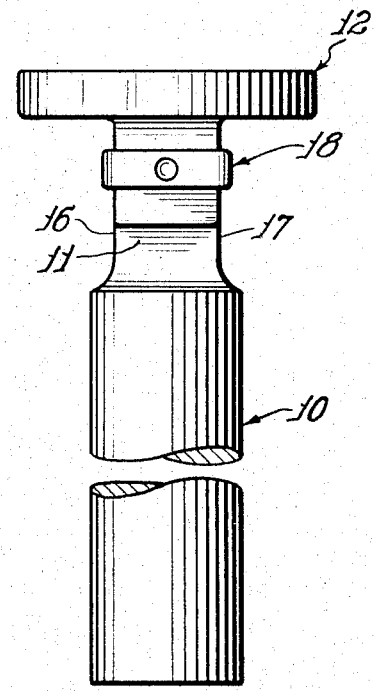
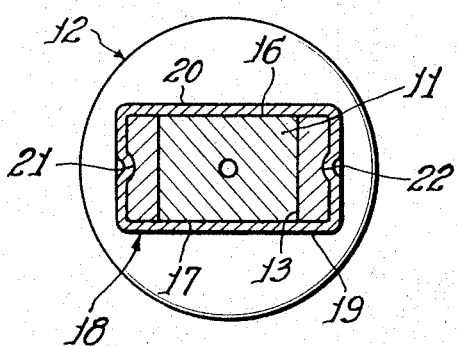

The present invention relates to a piston and slipper assembly and more particularly to an assembly of this type wherein the relative movement between the slipper and the piston is in one plane whereby a single axis joint is provided.

The present invention is particularly useful in a fluid apparatus wherein piston control porting is employed.

It is therefore an important object of the present invention to provide an improved piston and slipper assembly wherein the relative movement between the piston and slipper is limited to one plane.

It is also an important object of the present invention to provide an improved piston and slipper assembly which is simple in construction and low in cost.

The present invention consists of the novel constructions, arrangements and devices to be hereinafter described and claimed for carrying out the above stated objects and such other objects as will be apparent from the following description of a preferred form of the invention, illustrated with reference to the accompanying drawings, wherein:

FIGURE 1 is a full external longitudinal view of the piston and slipper assembly according to the present invention.

FIGURE 2 is a cross section taken on line 2—2 of FIGURE 1; and FIGURE 3 is a full external longitudinal view of the piston and slipper assembly shown in FIGURE 1 but at right angles with respect thereto.

Like characters of reference designate like parts in the several views.

Referring now to FIGURE 1, a slipper and piston assembly according to the present invention is shown which comprises a piston 10 having a cylindrically shaped end 11 which is connected to a slipper 12 within a cylindrical bore 13 therein; the inner surface 14, of which, is in matching engagement with the outer peripheral surface 15 of the cylindrical shaped end 11.

The cylindrical shaped end 11 is rectangular in cross section as shown in FIGURE 2, thereby providing a pair of oppositely disposed flat faces 16 and 17 and when assembled within the cylindrical bore 13 is locked therein by a rectangular metal band 18. The longer sides 19 and 20 of the rectangular metal band 18 span the faces 16 and 17 respectively thereby keeping the cylindrical end 11 captive within the cylindrical bore 13. The shorter sides of the rectangular metal band 18 are staked into a pair of notches 21 and 22 of the slipper 12, thereby fixing it in position.

When a piston and slipper assembly according to the present invention is used in a hydraulic mechanism which includes a swash plate or similar component and a rotatable cylinder block provided with a bore therein, in which the piston 10 is operable and the swash plate is at an angle, the piston 10 will be forced to rotate in the cylinder block bore as the block rotates. If the swash plate is at zero angle initially and the piston 10 is in a position where the piston and slipper assembly would lock up if the swash plate angle increases, the friction on one edge of the slipper 12 will rotate the piston 10 in the block so that the joint created by the piston and slipper assembly, as shown, can then bend and the slipper 12 lie flat on the swash plate.

In the event the piston and slipper assembly according to the present invention is used in a hydraulic mechanism, which requires that the single axis joint provided by the assembly be oriented in one direction in order that the porting in the piston 10 and the bore in which it operates are coordinated, the piston 10 must be assembled in the bore with the porting therein oriented in a direction such that the porting is coordinated and the swash plate must be at an angle so that the port coordination is maintained. Thereafter the swash plate may not be moved to zero angle position because the porting arrangement between the piston 10 and the bore in which it operates may be changed because the piston 10 in such a position is free to rotate.

While the present invention has been described in connection with a certain specific embodiment thereof, it is to be understood that this is by way of illustration and not by way of limitation and the scope of this invention is defined solely by the appended claims which should be construed as broadly as the prior art will permit.

I claim:
1. A piston and slipper assembly for use in a hydraulic mechanism having a swash plate operably associated with a slipper comprising:
   (a) a piston provided with a cylindrical shaped end having oppositely disposed flat faces;
   (b) a slipper having a cylindrical bore therein in matching engagement with the outer peripheral surface of the said cylindrical shaped end;
   (c) a rectangular band encompassing the said slipper and the said oppositely disposed flat faces whereby the said cylindrical shaped end is locked within the cylindrical bore of the said slipper.
2. A piston and slipper assembly according to claim 1 wherein means are provided for anchoring the said band to the said slipper.
3. A piston and slipper assembly according to claim 2 wherein the said means comprise a notch in the face of that portion of the said slipper having the said cylindrical bore therein and a depression in said band engaging the said notch.

References Cited

UNITED STATES PATENTS

| 2,209,480 | 7/1940 | Spencer | 74—559 |
| 3,304,884 | 2/1967 | Kouns | 103—162 |

FOREIGN PATENTS

| 736,518 | 9/1932 | France. |
| 605,242 | 7/1948 | Great Britain. |
| 497,113 | 8/1954 | Italy. |

FRED C. MATTERN, Jr., *Primary Examiner.*

W. S. RATLIFF, *Assistant Examiner.*